July 4, 1933.  A. A. BYERLEIN  1,916,655
PRESS MECHANISM
Filed June 27, 1931  2 Sheets-Sheet 1

Inventor
Arthur A. Byerlein
By Maréchal & Noe
Attorney

Inventor
Arthur A. Byerlein
By Maréchal & Noe
Attorney

Patented July 4, 1933

1,916,655

UNITED STATES PATENT OFFICE

ARTHUR A. BYERLEIN, OF DETROIT, MICHIGAN, ASSIGNOR TO GENERAL MACHINERY CORPORATION, OF HAMILTON, OHIO, A CORPORATION OF DELAWARE

PRESS MECHANISM

Application filed June 27, 1931. Serial No. 547,251.

This invention relates to presses for stamping or forming sheet metal or the like.

One object of the invention is the provision of a press having a die carrying part to which pressure is transmitted by a driving element incorporating a break device of predetermined strength adapted to break or crush upon a predetermined overload to save other working parts of the press from injury, the break device being insertable and removable in and through an opening provided in a side of the driving element.

Other objects and advantages of the invention will be apparent from the following description, the appended claims and the accompanying drawings, in which Fig. 1 is a side elevation, partly in section, through the driving element of a press embodying the present invention;

Figure 1:
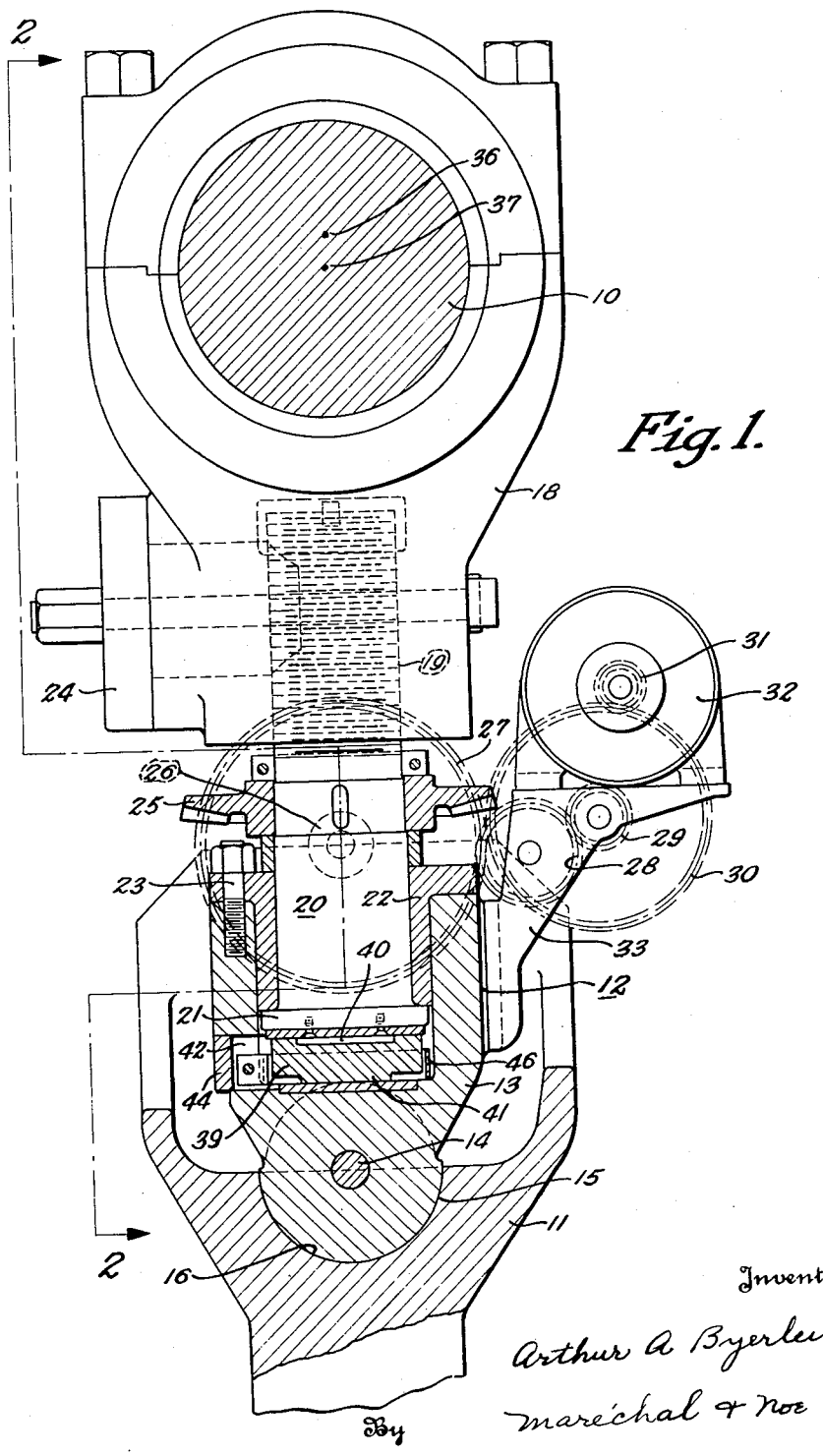

Referring more particularly to the drawings in which like numerals designate corresponding parts in the several views, 10 designates the crank shaft of a power press adapted for stamping or forming sheet metal and the like. The die which is adapted for engagement with the metal is carried by a die carrying slide part 11 which is guided for vertical reciprocatory movement in suitable guides provided in the press frame. Power is transmitted from the crank shaft 10 to the die carrying slide part 11 by means of a driving member or connecting rod designated generally 12.

The connecting rod 12 comprises a plurality of sections or members, the lower one of which, designated 13, is pivotally connected by a pivot pin 14 to the die carrying slide 11. The lower end of this section 13 is preferably cylindrically curved as indicated at 15 so as to seat in a cylindrically curved socket 16 provided in the part 11.

The upper section 18 of the connecting rod 12 is in power transmitting relationship with the crank shaft and is internally threaded at 19 so as to telescopically receive a screw 20 forming another section of the connecting rod. At the bottom of the screw 20 is a flange 21, and a sleeve 22 is secured by bolts 23 to the upper portions of the bottom section 13 so as to rotatably hold the screw 20 in the section 13. A clamp piece 24 is provided to hold the screw 20 in any desired position of adjustment in the upper section 18.

Suitably keyed to the screw 20 is a bevel gear 25 which may be rotated by a bevel pinion 26 fixed to a spur gear 27. The spur gear 27 may be rotated by gears 28, 29, 30 and 31 from an electric motor 32 which, as shown, is carried on a bracket 33 suitably fixed to a side of the section 13 of the connecting rod. Rotational movements of the bevel gear 25 by means of the gearing shown or by any other suitable means has the effect of extension or retraction of the screw in the upper section 18 of the connecting rod, causing variation of the height of the slide without effecting the length of the stroke. The length of stroke is of course determined by the distance between the points 36 and 37, point 36 being the center of rotation of the crank shaft. During rotational movement of the screw 20, the clamp piece 24 is loose, of course, so that the screw may be readily turned.

The upper portion of the bottom section 13 is socketed so as to receive the sleeve 22 and the bottom of the screw 20, as previously mentioned. In this socket is also held a break device 39. This break device is preferably a washer or plate of cast metal or other suitable material having such strength as to break or crush upon a predetermined overload so as to save other working parts of the press. As shown, it is cut away at its upper central portion as indicated at 40, and at its lower peripheral portion as indicated at 41 so that when an unusually large force is applied through the connecting rod to the slide carrying part 11 the break device 39 can crush and permit downward movement of the screw 20 with relation to the lower section 13 to a sufficient extent to prevent unusual forces being exerted.

Figure 2:
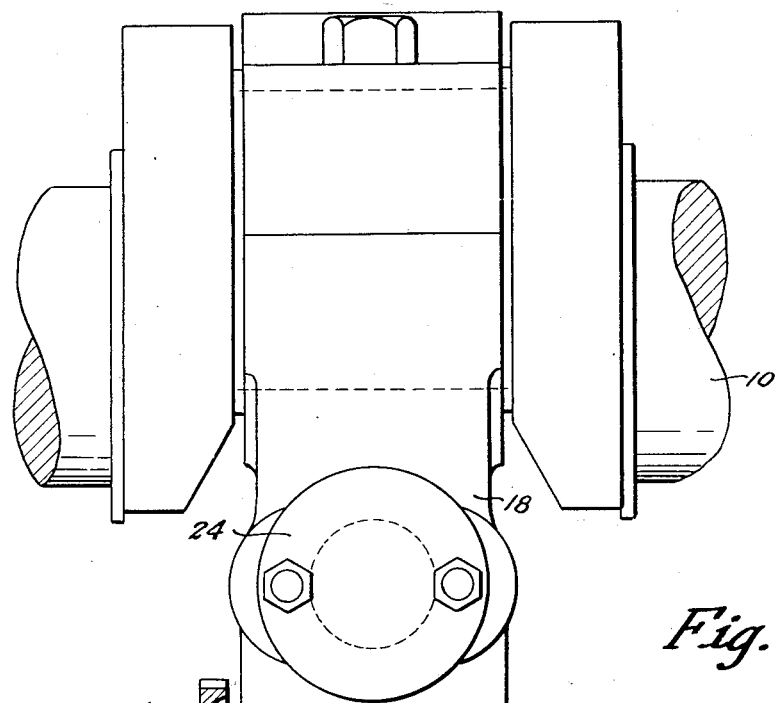
Fig. 2 is a section on the line 2—2 of Fig. 1.
Figure 3:
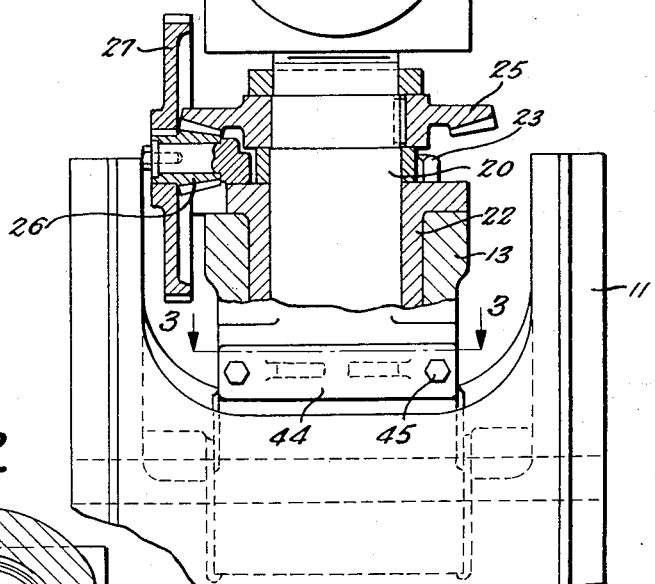
Fig. 3 is a section on the line 3—3 of Fig. 2.
Figure 3:
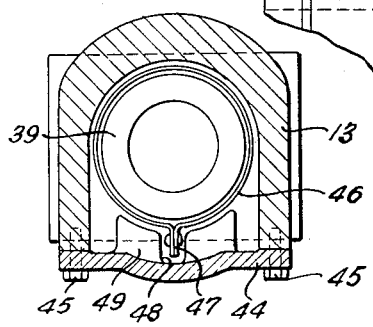

At one side of the socket portion of the section 13 the latter is provided with an opening 42, having a height equal to or slightly larger than the thickness of the break device 39, and having such width, as shown in Fig. 2, that the break device can be inserted in or removed from its normal position through this opening, or in other words, in a direction substantially transverse to the axis of the connecting rod. This opening is normally closed by a cover plate 44 which is secured in position by bolts 45. In order to facilitate the removal of the break device 39 the latter is enclosed or surrounded by a light ring or strap 46 having a handle portion 47 adjacent the opening 42. This handle portion 47 is receivable in a slot 48 provided in an extension 49 on the inner side of the cover plate 44, the extension 49 serving to retain the break device 39 in position. It will be understood that the cover plate 44 can be readily removed by first removing the bolts 45, and the break device 39 can then be pulled out by grasping the handle portion 47. It will be unnecessary to disconnect the several sections of the driving rod in order to make a replacement should the break device be crushed. The removal of the cover plate and the substitution of a new break washer for one that has been crushed or for one that is sufficiently strong for a particular operation of the press is a very simple matter and can be accomplished very quickly and without requiring the great amount of time that would be required if the several sections of the driving element had to be entirely disassembled.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a power press having a die carrying part, a driving element adapted for the transmission of force to the die carrying part, said element comprising a plurality of members and a break device of predetermined strength arranged between said members for the transmission of force from one member to the other, the break device normally rigidifying said sections with respect to one another but adapted to break upon a predetermined overload and prevent injury to other working parts of the press, one of said members having an opening at a side thereof through which the break device is insertable and removable, and an encircling ring enclosing said break device for facilitating its removal through said opening.

2. In a power press having a die carrying part, a driving element adapted for the transmission of force to the die carrying part, said element comprising a plurality of members and a break device of predetermined strength arranged between said members for the transmission of force from one member to the other, the break device normally rigidifying said sections with respect to one another but adapted to break upon a predetermined overload and prevent injury to other working parts of the press, one of said members having an opening adjacent said break device through which the break device is insertable and removable in a direction substantially transverse to the direction in which it transmits force between the members, an encircling ring enclosing said break device for facilitating its removal through said opening, and removable means for closing said opening and retaining said break device in position.

3. In a power press having a slide part, a driving rod for said slide part formed of sections and including a break device of determined strength normally rigidifying said sections with respect to one another but adapted to break upon a predetermined overload and prevent injury to other working parts of the press, one of said sections having a socket portion receiving the end of the other section and the break device, said socket portion having an opening at one side adjacent the break device through which the break device is removable, an encircling ring enclosing said break device for facilitating its removal, and means for closing said opening and retaining said break device in position.

4. In a power press having a slide part, an adjustable length driving connecting rod for said slide part formed of sections and including a break device of determined strength normally rigidifying said sections with respect to one another but adapted to be crushed upon a predetermined overload and prevent injury to other working parts of the press, one of said sections having a socket portion receiving the end of the other section and the break device, said socket portion having an opening at one side thereof adjacent the break device through which the break device is removable and insertable in a direction transverse to the axis of the connecting rod, an encircling ring enclosing said break device and having a handle portion accessible through said opening for facilitating the removal of the break device after it has been crushed, and a cover plate detachably connected to said socket portion in a removable manner for closing said opening and retaining said break device in position.

In testimony whereof I hereto affix my signature.

ARTHUR A. BYERLEIN.